Patented Nov. 9, 1937

2,098,256

UNITED STATES PATENT OFFICE 2,098,256

METHOD OF PREVENTING CONTACT SEIZURE OF METAL PARTS

Arthur L. Parker, Cleveland, Ohio

No Drawing. Application August 15, 1934,
Serial No. 740,029

5 Claims. (Cl. 91—70)

It is well known that soft metal parts such as aluminum and aluminum alloy, when making close fitting contact, sometimes seize and become what is often referred to as "welded", so that it is impossible to move the parts one on the other. This occurs more particularly in connection with threaded parts where the threads on one part will seize the threads on the other through intimate contact therewith and prevent the proper completing of the intended coupling.

An object of the invention is to provide a method of treating the threaded metal parts with an anti-seizing material of a character that will be caused to adhere to the threaded parts and form a protective coating therefor which will stand the attack of solvents thereon and the ordinary handling of the same without chipping until said threaded parts are re-united.

In carrying out the method, an anti-seizing material such as aluminum stearate is used as a base for a protective coating. Zinc stearate or lead stearate may be used. The aluminum stearate is dissolved in a solvent which includes alcohol, although turpentine, carbon tetrachloride, or some similar volatile or semi-volatile solvent may be used. In order to give firmness and durability to the coating, lacquer is used preferably by mixing the same with the aluminum stearate. Good results, however, have been obtained by the applying of the metal stearate solution, drying or hardening the same, and then spraying the same with lacquer.

In the preferred form of the invention the aluminum stearate is mixed in a thin solution of lacquer with a slight alcohol content. Preferably a small amount of coloring matter is added to the mixture so that when the coating is completed on the threaded parts it will identify the threads. The coloring matter, however, is not essential to the protecting of the threaded metal parts. After the solution is formed, it is flowed onto the threaded parts. This may be done by dipping or by spraying in any suitable way. A relatively thin coating of the mixture will be caused to adhere to the threaded parts. The solvent forms a firm adhering coating of the metal stearate and the lacquer. This may be accomplished in any suitable way, preferably by baking at a moderately elevated temperature of between 200 and 300 degrees Fahrenheit. This will produce a very firm coating which will stand handling without marring or chipping and which will not be attacked by solvents such as gasoline and motor oils. The metal stearate will plasticize or extend the lacquers so as to render it less brittle and prevents crazing or chipping of the coating. The metallic stearate and lacquer are used in such proportions as to form a mixture that will readily flow and form a thin film adhering to the threads when the solvent is driven off. A shellac solution may be used in place of lacquer.

From the above it will be noted that a method has been provided of preventing contact seizure between threaded soft metal parts, which method is carried out at the place of manufacturing of the parts. The customer when assembling the parts, without applying any compound whatever, may accomplish a perfect joining of the threaded parts without any disturbing contact seizure of the parts. It is preferable to treat both the male and the female threads if accessible for this purpose.

The coating on the threaded parts not only prevents contact seizure but the coating may be applied to fittings after anodic treatment to prevent corrosion and to cover any imperfections in electrolytic coating. As the coating is insoluble in motor fuels, I find that it serves a dual purpose in protecting the metal parts and preventing seizure of the threads most satisfactorily.

It is obvious that minor changes in the materials and the method described may be made without departing from the spirit of the invention as set forth in the appended claims.

Having thus described the invention, what I claim as new and desire to secure by Letters Patent, is:

1. The method of preventing contact seizure of threaded aluminum and like metal parts, consisting in coating the parts, after they have been threaded and subjected to anodic treatment, locally at the threaded portions thereof with a solution including a volatile solvent and lacquer and a stearate of the group consisting of zinc, aluminum and lead stearates which is insoluble in gasoline and motor oils, vaporizing the solvent, and baking to form on the threaded parts a thin adhering protecting coating of the stearate.

2. The method of preventing contact seizure of threaded metal parts, consisting in coating the parts after they have been threaded with a solution of aluminum stearate mixed in a thin solution of lacquer with an alcohol content to which has been added a small amount of coloring matter, vaporizing the solvent, and forming on the threaded portions of the metal parts an adhering protecting coating.

3. An article of manufacture comprising a soft metal part such as aluminum and aluminum alloy, having threaded portions which are coated with a thin adherent film of an anti-seizing material selected from the group consisting of zinc, aluminum and lead stearates, combined with a modifying ingredient selected from the group consisting of lacquer bases and shellac in such an amount as to form a coating which will stand handling without marring or chipping.

4. The method of preventing contact seizure of soft metal parts such as aluminum and aluminum alloy having threaded portions, which consists in coating the threaded portions with a solution including an anti-seizing material selected from the group consisting of zinc, aluminum and lead stearates combined with a modifying ingredient selected from the group consisting of lacquer bases and shellac in the presence of a volatile solvent for the said material and said ingredient, and vaporizing the solvent for forming on the threaded portions a hard thin adherent coating of substantially uniform thickness.

5. The method of preventing contact seizure of threaded aluminum and like soft metal parts employed for conducting gasoline and motor oils, consisting in coating the threaded portions of the parts with a solution including an anti-seizing material selected from the group consisting of zinc, aluminum and lead stearates combined with a modifying ingredient selected from the group consisting of lacquer bases and shellac in the presence of a volatile solvent for the said material and said ingredient, said ingredient being insoluble in gasoline or motor oil and being present in such an amount as to provide with said material a coating which will stand handling without marring or chipping, vaporizing the solvent for forming a substantially uniform film of said material and said ingredient on the threaded portion, and baking at a temperature of substantially 200 to 300 degrees F. for producing a hard thin adherent localized coating on said threaded portion.

ARTHUR L. PARKER.